United States Patent [19]

Obara

[11] Patent Number: 4,864,092

[45] Date of Patent: Sep. 5, 1989

[54] ELECTRIC DISCHARGE MACHINING POWER SOURCE

[75] Inventor: Haruki Obara, Sagamihara, Japan

[73] Assignee: Fanuc Ltd., Minamitsuru, Japan

[21] Appl. No.: 211,123

[22] Filed: Jun. 21, 1988

Related U.S. Application Data

[63] Continuation of Ser. No. 10,165, filed as PCT JP86/00271 on May 29, 1986, published as WO86/06996 on Dec. 4, 1986, abandoned.

[30] Foreign Application Priority Data

May 30, 1985 [JP] Japan .............................. 60-115220

[51] Int. Cl.$^4$ ............................................. B23H 1/02
[52] U.S. Cl. .............................. 219/69.18; 219/69.13
[58] Field of Search ................ 219/69 P, 69 C, 69.18, 219/69.13; 323/287, 282, 288, 285, 286; 320/1

[56] References Cited

U.S. PATENT DOCUMENTS

| | | | |
|---|---|---|---|
| 2,773,168 | 12/1956 | Williams | 219/69 C |
| 3,020,448 | 2/1962 | Fefer | 219/69 C |
| 3,257,583 | 6/1966 | Pfau | 219/69 P |
| 3,259,795 | 7/1966 | Schierholt | 219/69 C |
| 3,277,337 | 10/1966 | Webb | 219/69 P |
| 3,327,202 | 6/1967 | Mills | 323/288 |
| 3,745,444 | 7/1973 | Calkin et al. | 323/287 |
| 3,814,894 | 6/1974 | Bell, Jr. et al. | 219/69 P |
| 3,916,138 | 10/1975 | Pfau | 219/69 P |
| 4,245,288 | 1/1981 | McLyman | 323/287 |
| 4,306,136 | 12/1981 | Delpretti | 219/69 P |
| 4,590,353 | 5/1986 | Obara et al. | 219/69 C |
| 4,681,997 | 7/1987 | Inoue et al. | 219/69 C |

FOREIGN PATENT DOCUMENTS

| | | | |
|---|---|---|---|
| 1238190 | 6/1960 | France | 219/69 C |
| 1233339 | 10/1960 | France | 219/69 C |
| 117460 | 7/1984 | Japan | 323/282 |
| 8501685 | 4/1985 | PCT Int'l Appl. | 219/69 C |

*Primary Examiner*—A. D. Pellinen
*Assistant Examiner*—Geoffrey S. Evans
*Attorney, Agent, or Firm*—Staas & Halsey

[57] ABSTRACT

An electric discharge machining power source is provided which charges a capacitor connected in parallel with an electrode and a work, and applies a charge voltage between the electrode and the work to cause electric discharge, thereby performing electric discharge machining. The machining power source allows rapid charging of the capacitor and is inexpensive while the power source efficiency is improved. A switching element is arranged in the charge circuit of the capacitor which is capable of being turned on and off. The switching element connects the capacitor to a direct current power source and charges the capacitor. A flywheel circuit including an inductance and a diode is provided in the charge circuit. A reverse voltage that is caused by a stray inductance in the electric discharge circuit during electric discharge is applied to the capacitor as a positive voltage through the flywheel circuit.

2 Claims, 3 Drawing Sheets

ELECTRIC DISCHARGE MACHINING POWER SOURCE

This is a continuation of copending application Ser. No. 010,165, filed as PCT JP86/00271 on May 29, 1986, published as WO86/06996 on Dec. 4, 1986, now abandoned.

BACKGROUND OF THE INVENTION

The present invention relates to an electric discharge machining power source of an electric discharge machine which performs machining by using electric discharge of a capacitor.

A power source circuit of an electric discharge machine which performs machining by using electric discharge of a capacitor conventionally uses a circuit as shown in FIG. 5. Referring to FIG. 5, reference symbol E denotes a power source; R1, a current-limiting resistor; C2, a charge/discharge capacitor; P, an electrode; W, a work; T2, a transistor serving as a switching element; and G2, its base. With this circuit, a pulse is input to the base G2 of the transistor T2 to turn it on and thus to charge the capacitor C2. The charge voltage of the capacitor C2 is applied between the electrode P and the work W. The discharge current from the capacitor C2 flows as an electric discharge between the electrode P and the work W, thereby performing electric discharge machining. In order to quickly charge the capacitor C2, the resistance of the resistor R1 must be set small. However, when the resistance of the resistor R1 is set small, the resistor R1 generates heat, resulting in a large energy loss.

In view of this situation, an electric discharge machining power source as shown in FIG. 6 is developed (Japanese Patent Application No. 59-35984). Referring to FIG. 6, reference symbol E denotes a power source; T3 and T4, charge and discharge transistors serving as switching elements; G3 and G4, bases thereof; C3, a charge/discharge capacitor; D3, a diode; P, an electrode; W, a work; and L3, an inductance.

The operation of this electric discharge machining power source circuit will be described. First, when a pulse is applied to the base G3 of the charge transistor T3 to turn it on, a current flows from the power source E to the capacitor C3, inductance L3, transistor T3, and power source E, and the capacitor C3 starts to be charged. At this time, the current linearly increases because of the impedance of the stray inductance L3. Then, the charge voltage of the capacitor C3 also gradually increases. When application of the pulse to the base G3 of the charge transistor T3 is stopped to turn it off, the current as the energy accumulated in the stray inductance L3 flows through the diode D3, thus constituting a so-called flywheel circuit to further charge the capacitor C3. In this case, the charge current and voltage to the capacitor C3 are determined by the value of the stray inductance L3 and the width of the pulse applied to the base G3 for turning on the transistor T3, as is apparent from the above description. Therefore, the charge voltage can be adjusted by adjusting the pulse width and the stray inductance L3.

In this manner, the capacitor C3 is charged, the pulse is applied to the base G4 of the transistor T4, and thus the transistor T4 is turned on. As a result, the charge voltage in the capacitor C3 is applied in the gap between the work W and the electrode P, the capacitor C3 starts discharging, and the discharge current flows. In this manner, since this electric discharge machining power source uses no power source limiting resistor, no energy loss is caused and good power source efficiency is ensured. However, since the discharge switching element T4 is used, the overall system becomes expensive. Particularly, in order to flow a large discharge current, a plurality of transistors T4 (only one is shown) serving as the switching elements must be connected in parallel with each other, rendering the electric discharge machining power source expensive.

SUMMARY OF INVENTION

It is an object of the present invention to provide an inexpensive electric discharge machining power source having a high power source efficiency wherein the above drawbacks of the conventional technique are eliminated and charging by a capacitor charge circuit is rapidly performed.

In order to achieve the above and other objects, according to the present invention, in an electric discharge machining power source wherein a capacitor connected in parallel with an electrode and a work is charged by a DC power source through a charge circuit, and a charge voltage of the capacitor is applied between the electrode and the work to cause electric discharge, thus performing electric discharge machining, only a switching element, and a flywheel circuit having an inductance and a diode are arranged in the charge circuit. The switching element is provided to be capable of being turned on and off, connects the capacitor to the D power source, and charges it. Therefore, no current-limiting resistor is provided in the charge circuit, and no switching element is provided in the eletric discharge circuit.

As described above, in the present invention, no current-limiting resistor is present in the capacitor charge circuit. Therefore, the absence of this resistor eliminates energy loss. In addition, the reverse voltage of the capacitor which is generated by the stray inductance in the electric discharge circuit during electric discharge also charges the capacitor to a positive voltage through the flywheel circuit. Therefore, an electric discharge machining power source having no energy loss and a good power source efficiency can be obtained.

DETAILED DESCRIPTION OF THE PREFERRED EMBODIMENTS

Figure 1:
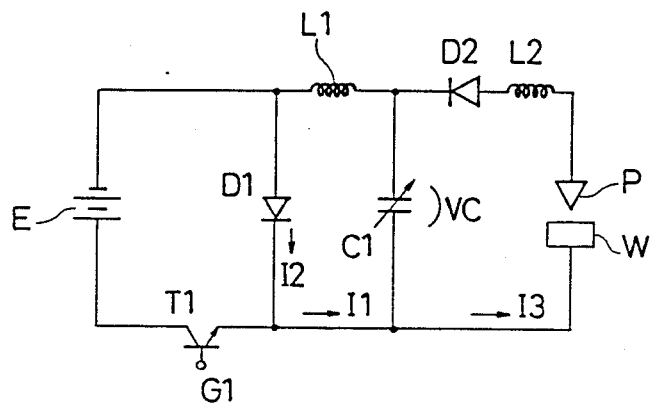
FIG. 1 is a circuit diagram of an electric discharge machining power source according to an embodiment of the present invention.

FIG. 1 is a circuit diagram of an electric discharge machining power source according to an embodiment of the present invention. Referring to FIG. 1, reference symbol E denotes a DC power source; P, an electrode; W, a work; T1, a transistor serving as a switching element; G1, its base terminal; C1, a capacitor; D1 and D2, diodes; L1, an inductance; and L2, a stray inductance of an electric discharge circuit of the machining power source. The inductance L1 and the diode D1 constitute a flywheel circuit, as will be described later. In order to minimize the surge voltage applied to the transistor T1, the circuit constituted by the transistor T1, the diode D1, and the DC power source E is fabricated as a printed circuit board so that the inductance of the same circuit is decreased to a minimum.

Figure 2:
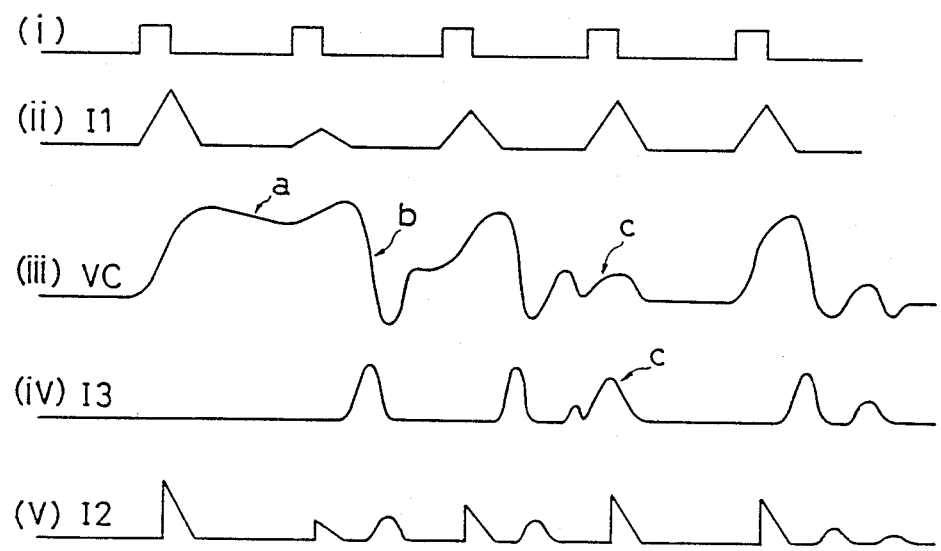
FIG. 2 is a timing chart showing the operation of the power source.

The operation of the electric discharge machining power source of this embodiment will be described with reference to the timing chart of FIG. 2. Assume that a pulse as shown in FIG. 2(i) is input to the base G1 of the transistor T1 to turn it on/off. If the inductance L1 is not large, a current I1, which charges the capacitor C1 when the transistor T1 is turned on, changes as shown in FIG. 2(ii). In other words, a relation $$dI1/dt=(EO-VC)/L1$$

is established (where EO is the power source voltage and VC is the charge voltage of the capacitor C1), and the value of the charge current I1 linearly increases over time. When the transistor T1 is turned off, the current I2 as the energy accumulated in the inductance L1 flows through the diode D1, as shown in FIG. 2(v), and a so-called flywheel circuit is further charges the capacitor C1. In this case, the value of the charge voltage VC of the capacitor C1 can be arbitrarily adjusted and set up to a value twice the power source voltage EO by the width of the pulse which turns on the transistor T1, the value of the inductance L1, and the capacitance of the capacitor C1, as is apparent from the above description.

In this manner, the charge voltage VC of the charged capacitor C1 is applied to the gap between the electrode P and work W. As shown by a in FIG. 2(iii), if no electric discharge occurs, the charge voltage VC of the capacitor C1 gradually decreases by the current leakage between the electrode P and work W. When the transistor T1 is turned on in the next cycle, the capacitor C1 is charged again. Therefore, the charge voltage VC increases again. The value of the charge current is small since the charge voltage VC is already close to the set charge voltage. The capacitor C1 is thus charged to the charge voltage VC which is close to the set charge voltage.

When the charge voltage VC of the capacitor C1 is applied between the electrode P and work W, electric discharge occurs. When the electric discharge current I3 flows into the work W and electrode P, as shown in FIG. 2(iv), the charge voltage VC of the capacitor C1 decreases, as indicated by b in FIG. 2(iii). However, the capacitor C1 is charged in the reverse direction to generate a reverse voltage because of stray inductance L2 existing between the capacitor C1 and the electrode P and work W. In this case, however, the electric charges that are charged in the reverse direction charge the capacitor C1 in the positive direction through the inductance L1 and the diode D1 of the flywheel circuit. Since the diode D1 is provided, even when the capacitor C1 is charged in the reverse direction when electric discharge ends, the capacitor C1 is recharged in the positive direction through the diode D1, thus reducing energy loss. Otherwise, the charge voltage VC of the capacitor C1 may be charged in the reverse direction, and then the charge current I1, which flows when the transistor T1 is turned on, becomes considerably large, resulting in a large energy loss.

On the other hand, if the electrode P and the work W are in a state close to a short-circuited state, electric discharge can continuously occur, as indicated by c in FIGS. 2(iii) and 2(iv). More specifically, once electric discharge occurs, the transistor T1 is immediately turned on to apply a voltage from the DC power source E across the electrode P and work W. This causes continuous electric discharge, thus resulting in an electric discharge having a large pulse width. Generally, when the pulse width of electric discharge is large, it degrades the smoothness of the machined surface of the work W. Therefore, continuous electric discharge is not preferable. However, as described above, since the set charge voltage VC of the capacitor C1 is determined by the capacitance of the capacitor C1, the value of the inductance L1, and the ON-time of the transistor T1, the ON-time width (the pulse width in FIG. 2(i)) of the transistor T1 can be reduced by suitably selecting the capacitance of the capacitor C1 or the value of the inductance L1.

For this reason, assume that the capacitance of the capacitor C1 and the value of the inductance L1 are set so that the ON-time width becomes about ½ or less the pulse width of the normal electric discharge current I3. Then, even if electric discharge occurs in a state wherein the electrode P and the work W are in a state close to a short-circuited state and the transistor T1 is turned on to apply the power source voltage across the electrode P and the work W, thereby causing electric discharge of a long electric discharge width, since the ON-time width of the transistor T1 is short, no serious problem occurs. Furthermore, the capacitor C1 is quickly charged since there is no resistor in the charge circuit. Therefore, electric discharge does not occur often during charging, and one-shot electric discharge energy will not be too small very often. The ON-pulse width of the pulse for turning on the transistor T1 can be reduced and the capacitor C1 can be charged to a charge voltage by a plurality of ON pulses.

Figure 3:
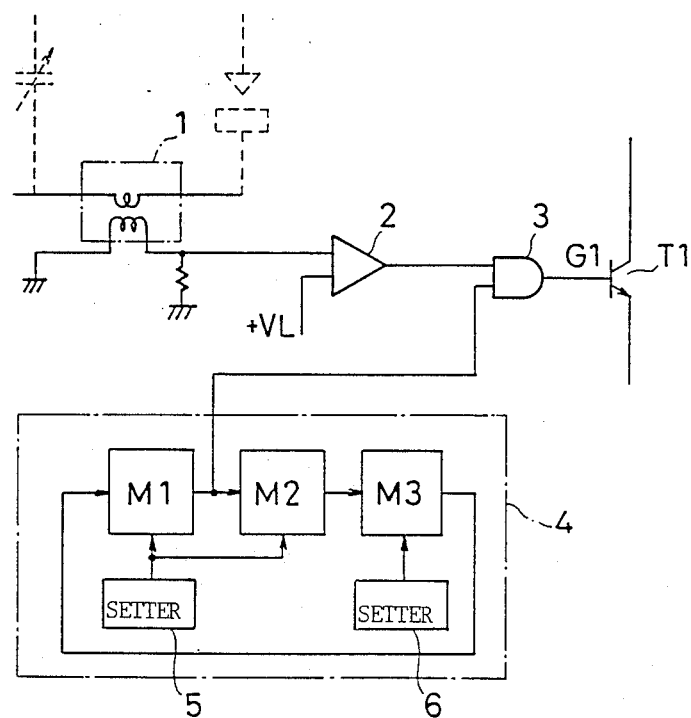
FIG. 3 is a circuit diagram of an on-off control circuit of the switching element shown in FIG. 1.

As described above, according to the present invention, since electric discharge machining is performed by cyclically turning on/off the transistor T1, the control unit can be simplified. It must be noted that the charge current to the capacitor C1 flows during a time period twice the pulse width of the pulse for turning on the transistor T1, thus charging the capacitor C1, as shown in FIG. 2(ii). Therefore, after the ON time of the transistor T1, an OFF time longer than at least the ON time must be provided. The electric discharge current I3 can be detected and the transistor 1 can then be prevented from being turned on during this time period so as to prevent charging during electric discharge. FIG. 3 shows an embodiment of this case.

Figure 4:
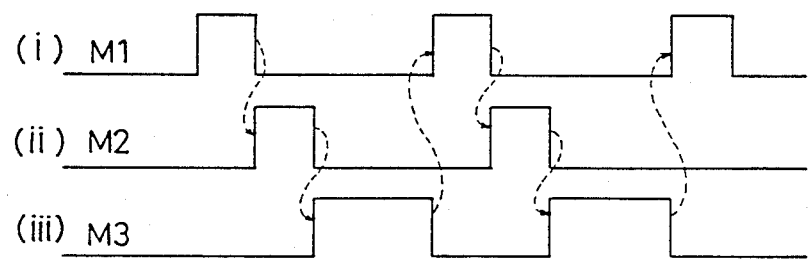
FIG. 4 is a timing chart showing the operation of the control circuit.
Figure 5:
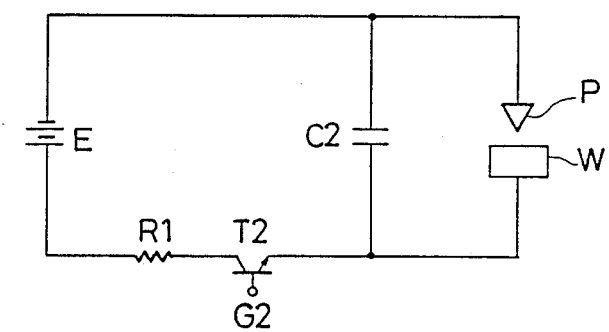
FIG. 5 is a circuit diagram of a conventional electric discharge machining power source.
Figure 6:
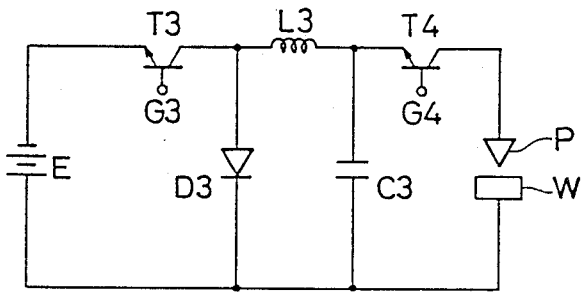
FIG. 6 is a circuit diagram of an already developed electric discharge machining power source.

Referring to FIG. 3, reference numeral 1 denotes a current transformer provided in the electric discharge circuit for detecting the electric discharge current I3 flowing between the work W and the electrode P shown in FIG. 1. An output from the current transformer 1 is input to a comparator 2 and compared with a reference voltage +VL. An output from the comparator 2 is input to one input terminal of an AND circuit 3, and an output from the AND circuit 3 turns on/off the transistor T1 shown in FIG. 1. Reference numeral 4 denotes a switching control circuit; and M1, M2, and M3, one-shot multivibrators, in which the one-shot multivibrator M1 outputs an ON-time pulse for turning on the transistor T1, the one-shot multivibrator M2 is triggered by the trailing edge of the pulse from the one-shot multivibrator M1 and outputs a pulse having a pulse width the same as that of the pulse from the one-sot multivibrator M1, and the one-shot multivibrator M3 outputs an output pulse having the OFF-time width of the transistor T1. The multivibrator M3 is triggered by the trailing edge of the pulse from the one-shot multivibrator M2. The trailing edge of the pulse from the one-shot multivibrator M3 triggers the one-shot multivibrator M1. Reference numerals 5 and 6 denote setters for setting the pulse widths. Since the pulse widths of the pulses from the one-shot multivibrators M1 and M2 are the same, they are set by the single setter 5. The setter 6 sets the OFF time and is optimally set in accordance with the machining state. As shown in FIG. 4, the trailing edge of the pulse from the one-shot multivibrator M1 triggers the one-shot multivibrator M2. The trailing edge of the pulse from the one-shot multivibrator M2 triggers the one-shot multivibrator M3. The trailing edge of the pulse from the one-shot multivibrator M3 triggers the one-shot multivibrator M1. This operation is sequentially repeated and the output from the one-shot multivibrator M1 is input to the other input terminal of the AND circuit 3.

The operation of the switching control circuit 4 will be described. The one input terminal of the AND circuit 3 cyclically receives an H-level signal from the one-shot multivibrator M1, as shown in FIG. 4(i). As far as the other input terminal of the AND circuit 3, i.e., the signal from the comparator 2 is at H level, the AND circuit 3 cyclically outputs an output pulse of the one-shot multivibrator M1 to turn on the transistor T1. Meanwhile, the current transformer 1 detects a current between the electrode P and the work W and supplies it to the comparator 2. When the electric discharge current I3 flows and the output from the current transformer 1 exceeds the reference voltage VL of the comparator 2, the comparator 2 outputs an L-level output signal. When the output of the comparator 2 becomes L level, the AND circuit 3 is disabled and outputs no signal irrespective of the input to its other input terminal. More specifically, when the output pulse of the one-shot multivibrator M1 is generated at the same time with an electric discharge current I3, the AND circuit 3 outputs no output and does not turn on the transistor T1. Thus, the transistor T1 will not be turned on to charge the capacitor C1 while the capacitor C1 discharges and an electric discharge current flows between the work W and the electrode P.

As described above, since the ON- and OFF-time widths of the one-shot multivibrator M2 are the same, even if the setter 6 sets a too short OFF-time width, the OFF time will not expire and turn on the transistor T1 during charging the capacitor C1.

In the above embodiment, a diode D2 is provided to prevent a reverse voltage from flowing between the electrode P and the work W. However, the diode D2 need not always be provided.

I claim:

1. An electric discharge machining power source having a capacitor, connected in parallel with an electrode and a work, which is charged by a direct current power source, a charge voltage of the capacitor being applied between the electrode and the work to cause electric discharge for performing electric discharge machining, comprising:
   a charge circuit including:
      a single switching element which is capable of being turned on and off, said single switching element connecting the capacitor to the direct current power source and charging the capacitor, said charge circuit not including limiting resistor; and
      a flywheel circuit having an inductance and a diode coupled to the capacitor;
   an electric discharge circuit including the capacitor and an electrode-work path, said electric discharge circuit not including a switching element; and
   control means for turning on and off said single switching element so that said single switching element has an OFF-time width which is longer than an ON-time width, said control means including:
      a first one-shot multivibrator for outputting pulses, each having an ON-time width;
      a second one-shot multivibrator for outputting pulses, each having the same width as the ON-time width; and
      a third one-shot multivibrator, said first, second and third one-shot multivibrators being cyclically connected and each being triggered by a trailing edge of one of said one-shot multivibrators that is connected to an input side thereof, the OFF-time width being controlled by said third one-shot multivibrator.

2. An electric discharge machining power source having a capacitor, connected in parallel with an electrode and a work, which is charge by a direct current power source, a charge voltage of the capacitor being applied between the electrode and the work to cause electric discharge for performing electric discharge machining, comprising:
   a charge circuit including:
      a single switching element which is capable of being turned on and off, said single switching element connecting the capacitor to the direct current power source and charging the capacitor, said charge circuit not including a current limiting resistor; and
      a flywheel circuit having an inductance and a diode coupled to the capacitor;
   an electric discharge circuit including the capacitor, an electrode-work path, and means for detecting an electric discharge current and outputting a signal based upon said electric discharge current, said electric discharge circuit not including a switching element; and
   control means for turning on and off said single switching element, and for preventing said single switching element from being turned on while the electric discharge current is being detected by said discharge current detection means, said control means including:
      a first one-shot multivibrator for outputting pulses, each having an ON-time width;
      a second one-shot multivibrator for outputting pulses, each having the same width as the ON-time width; and
      a third one-shot multivibrator, said first, second and third one-shot multivibrators being cyclically connected and each being triggered by a trailing edge of one of said one-shot multivibrators that is connected to an input side thereof, the OFF-time width being controlled by said third one-shot multivibrator.

* * * * *